US011061988B2

(12) United States Patent
Chapman et al.

(10) Patent No.: US 11,061,988 B2
(45) Date of Patent: Jul. 13, 2021

(54) REDUCING WEB PAGE LOAD TIMES

(71) Applicant: International Business Machines Corporation, Armonk, NY (US)

(72) Inventors: Matthew Chapman, Eastleigh (GB); Chengxuan Xing, Romsey (GB); Ashley Harrison, Southampton (GB); Andrew J. Daniel, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 128 days.

(21) Appl. No.: 16/143,870

(22) Filed: Sep. 27, 2018

(65) Prior Publication Data

US 2020/0104423 A1 Apr. 2, 2020

(51) Int. Cl.

| | |
|---|---|
| ***G06F 15/16*** | (2006.01) |
| ***G06F 16/957*** | (2019.01) |
| ***H04L 29/08*** | (2006.01) |
| ***G06F 16/958*** | (2019.01) |

(52) U.S. Cl.

CPC ........ *G06F 16/9574* (2019.01); *G06F 16/958* (2019.01); *H04L 67/22* (2013.01)

(58) Field of Classification Search

CPC ........ G06F 8/65; G06F 17/30598; G06F 8/70; G06F 8/61; G06F 16/285; G06F 9/44521; G06F 16/9574; G06F 16/958; G06F 17/30902; G06F 17/3089; H04L 67/34; H04L 41/0816; H04L 41/0826; H04L 41/0893; H04L 43/0876; H04L 47/70; H04L 67/22; H04L 43/0864

See application file for complete search history.

(56) References Cited

U.S. PATENT DOCUMENTS

| | | | | |
|---|---|---|---|---|
| 8,346,889 | B1 * | 1/2013 | Chiu .................. | G06F 9/44521 709/203 |
| 9,049,246 | B2 | 6/2015 | Vecera et al. | |
| 9,052,914 | B2 | 6/2015 | Kieffer | |
| 9,405,555 | B2 | 8/2016 | Livshits et al. | |

(Continued)

OTHER PUBLICATIONS

"Concepts, Webpack" [online] Webpack [retrieved Aug. 15, 2018], retrieved from the Internet: <https://webpack.js.org/concepts/>, 4 pg.

(Continued)

*Primary Examiner* — Cheikh T Ndiaye
(74) *Attorney, Agent, or Firm* — Cuenot, Forsythe & Kim, LLC

(57) ABSTRACT

Building of a web application includes receiving the web application that is comprised of a plurality of modules, the web application comprising a plurality of pages; and receiving respective usage statistics information for each of the plurality of pages. Building the application includes splitting the plurality of modules into one or more bundles by determining for each of the plurality of modules whether to include that module in a main bundle of the web application based on how many of the plurality of pages utilize that module and based on respective usage statistics associated with each of the plurality of pages that utilize that module; and then building a production version of the web application comprising the main bundle.

20 Claims, 5 Drawing Sheets

(56) References Cited

U.S. PATENT DOCUMENTS

| | | | | |
|---|---|---|---|---|
| 2007/0288644 | A1* | 12/2007 | Rojas | G06F 8/38 709/230 |
| 2011/0029899 | A1 | 2/2011 | Fainberg et al. | |
| 2011/0044354 | A1* | 2/2011 | Wei | H04L 41/0816 370/468 |
| 2012/0066586 | A1 | 3/2012 | Shemesh | |
| 2016/0357544 | A1* | 12/2016 | Lewallen | H04L 67/34 |
| 2018/0052811 | A1* | 2/2018 | Gonzalez del Solar | G06F 3/0481 |

OTHER PUBLICATIONS

Singh, P., "Code Chunking with Webpack—A Pragmatic Approach," [online] React Weekly, a Medium corporation, Sep. 3, 2016, retrieved from the Internet: <https://medium.com/reactweekly/code-chunking-with-webpack-a-pragmatic-approach-e17e8bcc6453>, 3 pg.

Yu, G., "Cut your web application's load time in half with these Webpack optimization techniques,"[online] [retrieved Aug. 15, 2018], retrieved from the Internet: <https://medium.com/netscape/cut-your-web-applications-load-time-in-half-with-these-webpack-optimization-techniques-e9f92dbaab4e>, 5 pg.

"Code Splitting," [online] Webpack [retrieved Aug. 15, 2018], retrieved from the Internet: <https://webpack.js.org/guides/code-splitting/>, 2 pg.

* cited by examiner

| | Dashboard | Catalog | Templates | Notifications |
|---|---|---|---|---|
| Module Requirements | B | A, B | A, B | A |
| Usage Data | 100% | 50% | 10% | 5% |

FIG. 3A

| | Main Bundle | Dashboard | Catalog | Templates | Notifications |
|---|---|---|---|---|---|
| Simple Counting | A, B | - | - | - | - |
| Method of FIG. 2B | B | - | A | A | A |

FIG. 3B

REDUCING WEB PAGE LOAD TIMES

BACKGROUND

The present invention relates to web applications, and more specifically, splitting application code into bundles.

One web development technique for creating interactive web applications is bundling. Bundling utilizes techniques such as AJAX (Asynchronous JavaScript And XML). In this model, a single-page web interface is composed of individual components which can be updated/replaced independently, so that the entire page does not need to be reloaded on each user action. This, in turn, helps to increase the levels of interactivity, responsiveness and user satisfaction. This model also benefits from code modulization in which code modules are combined to construct the web application.

While maintaining modular code can be beneficial for development purposes, such code may not be ideal for a production environment. Generating an individual http network request for all the modular files may not be efficient. For example, a web application may have 100 different modules and loading that application would generate 100 requests to fetch the 100 files.

SUMMARY

A method includes receiving, by a computer, a web application comprising a plurality of modules, the web application comprising a plurality of pages; receiving, by the computer, respective usage statistics information for each of the plurality of pages; splitting, by the computer, the plurality of modules into one or more bundles by determining for each of the plurality of modules whether to include that module in a main bundle of the web application based on how many of the plurality of pages utilize that module and based on respective usage statistics associated with each of the plurality of pages that utilize that module; and building, by the computer, a production version of the web application comprising the main bundle.

A system includes a processor programmed to initiate executable operations. In particular the executable instructions include: receiving a web application comprising a plurality of modules, the web application comprising a plurality of pages; receiving respective usage statistics information for each of the plurality of pages; splitting the plurality of modules into one or more bundles by determining for each of the plurality of modules whether to include that module in a main bundle of the web application based on how many of the plurality of pages utilize that module and based on respective usage statistics associated with each of the plurality of pages that utilize that module; and building a production version of the web application comprising the main bundle.

A computer program product includes a computer readable storage medium having program code stored thereon. In particular, the program code is executable by a data processing system to initiate operations including: receiving, by the data processing system, a web application comprising a plurality of modules, the web application comprising a plurality of pages; receiving, by the data processing system, respective usage statistics information for each of the plurality of pages; splitting, by the data processing system, the plurality of modules into one or more bundles by determining for each of the plurality of modules whether to include that module in a main bundle of the web application based on how many of the plurality of pages utilize that module and based on respective usage statistics associated with each of the plurality of pages that utilize that module; and building, by the data processing system, a production version of the web application comprising the main bundle.

BRIEF DESCRIPTION OF THE DRAWINGS

FIG. 3A and FIG. 3B illustrate an example splitting of application code into bundles in accordance with the principles of the present disclosure.

DETAILED DESCRIPTION

Figure 1:
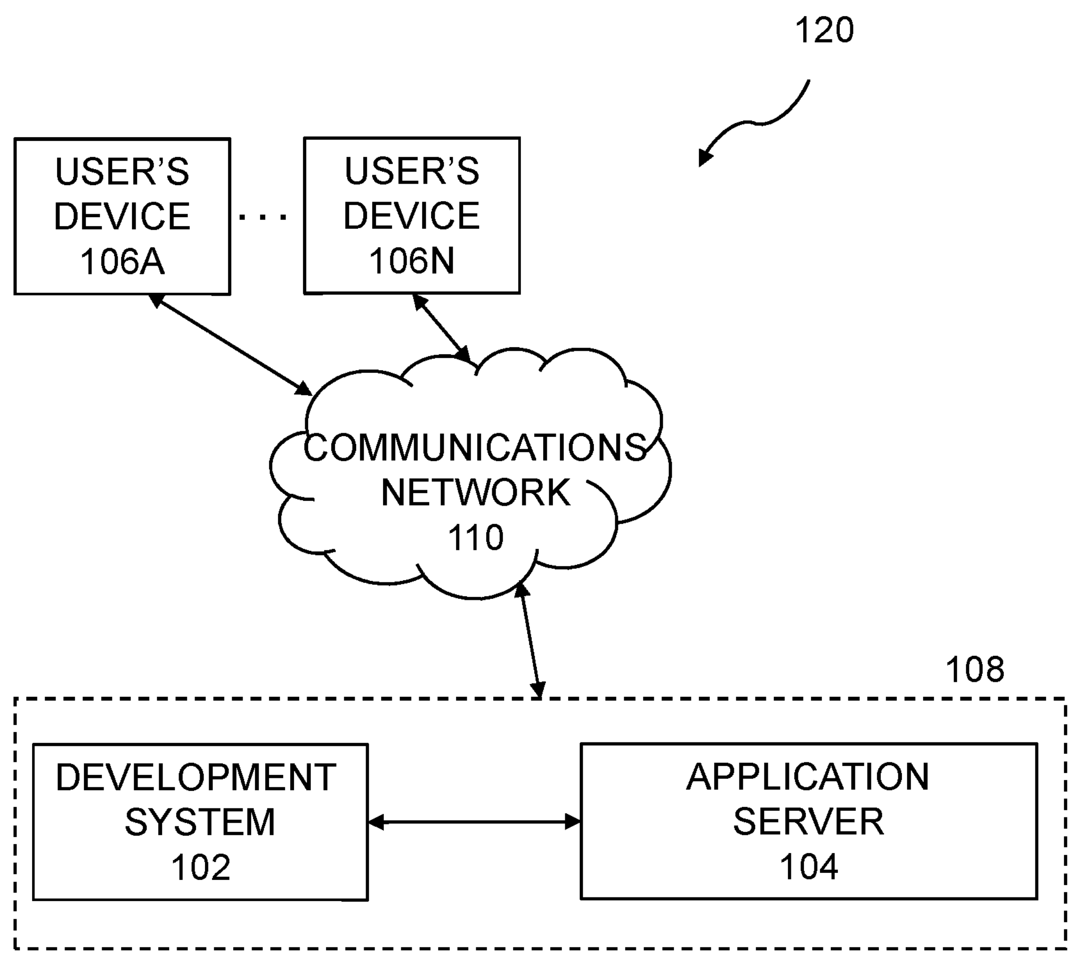
FIG. 1 illustrates a distributed computer-based system in accordance with the principles of the present disclosure.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being). The terms "employee" and "agent" are used herein interchangeably with the term "user".

As mentioned above, maintaining modular code can be beneficial for development purposes but may not be ideal for a production environment. Generating an individual http network request for all the modular files may not be efficient. For example, a web application may have 100 different modules and loading that application would generate 100 requests to fetch the 100 files (i.e., modules). One approach to addressing this issue is to bundle the 100 files into 1 large file that allows the browser to download the application using a single request. On a high level, module bundling is simply the process of stitching together a group of modules (and their dependencies) into a single file (or group of files) in the correct order.

Module bundlers manage and load interdependent modules but do it as part of the application build rather than at runtime. So instead of loading module dependencies as they appear when code is executed in a browser, a bundler stitches together all modules into a single file (a bundle) before the execution. Furthermore, module bundlers typically process JavaScript code, as well as all static assets, such as stylesheets, images, and fonts, into a bundled file.

Processing can include all the necessary tasks for managing and optimizing code dependencies, such as compilation, concatenation, minification, and compression.

One advantage of a bundler is that it leaves far fewer files that the browser has to download. This can give a web application a performance advantage, as it may decrease the amount of time it takes to load. However, depending on the number of modules the application has, this doesn't always have to be the case. Especially for big applications as loading one huge monolithic file can also block starting the application at the beginning. Thus, one further refinement involves multiple bundles and organizing the modules into the different bundles.

When packaging a web application for efficient delivery to a users' browser, code that is considered common (reused multiple times) to the overall application is typically loaded first, and then when each page is visited by the user, any additional code that is required for that page is then loaded. This is known as 'code splitting'. Having code that is regularly used in a single bundle (the main bundle) can make the page loading more efficient. But if the code in a bundled file is rarely being used, page loading is made slower by loading the unused code. It can be difficult for an application developer to determine which code modules are going to be used together since the developer may not exactly know how users are going to use the web application.

FIG. 1 is a block diagram illustrating an example of a network data processing system 120 that includes a communication network 110. The communication network 110 is the medium used to provide communications links between various devices and data processing systems connected together within the computing environment (or network data processing system, etc.) 120. The communication network 110 may include connections, such as wire, wireless communication links, or fiber optic cables. The communication network 110 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

In embodiments of the present disclosure, a development system 102 is provided such that developers can develop web applications. In some specific examples below, a web application includes JavaScript modules that a module bundler can use to produce a single page web application. These specific examples are included not to limit the scope of the present disclosure to only those example embodiments, but to allow the features of the present disclosure to be described in a clearer manner.

A server 104 is depicted in FIG. 1 that, as described below, receives requests from client devices 106A-106N (e.g., a web browser) and provides an instance of the web application to each of the devices 106A-106N. Thus, the server 104 can be referred to as a web server or a production server. In some embodiments, the server 104 is actually multiple computers networked together. In other embodiments, the server 104 is a centralized computer or cluster of computers. In yet further embodiments, the development system 102 and the server 104 can be consolidated so that they appear to be a single computer platform or located at a single geographical location. Thus, the development system 102 and the server 104 can be considered as a combination 108 that provides a web application to a user.

Figure 2A:
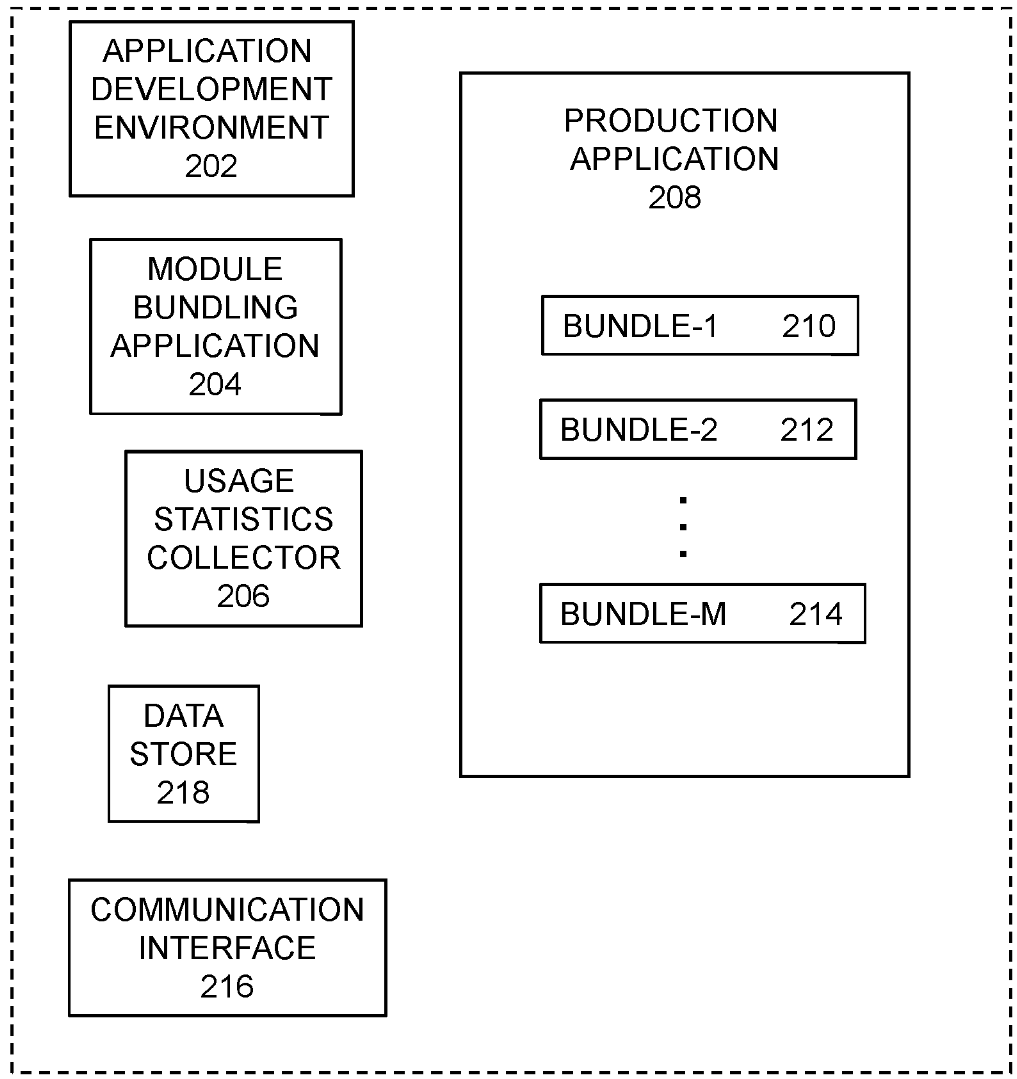
FIG. 2A illustrates a block diagram of functional elements of a computer-based system in accordance with the principles of the present disclosure.

FIG. 2A illustrates a block diagram of functional elements of a computer-based system 108 in accordance with the principles of the present disclosure. The system 108 includes an application development environment 202 that allows an app developer to create a web application. The development environment 202 provides tools and other resources that the application developer uses to create the source code and other elements that will be used to build the web application. A data store 218 is available that the development environment 202 can utilize to store and retrieve data. Although the data store 218 is depicted as a single functional block in FIG. 2A, one of ordinary skill will recognize that the data store 218 can include a plurality of different storage devices located at different locations.

The system 108 also includes a module bundling application 204. There are presently tools similar to the module bundling application 204 that implement the concept of splitting code into bundles to reduce page load times and provide a better user experience for web applications. However, one shortcoming with such tools is that they rely on the developer to decide how many bundles are needed, and which parts of the code are put into each bundle. The module bundling application 204 processes the web application developed within the development environment 202 to produce a production version of the web application 208 that can be served to a requesting client device via a communication interface 216. The production application 208 includes multiple bundles 210, 212, 214 of one or more modules.

As described in more detail below, the system 108 also includes a usage statistics collector 206. In a single page web application, for example, the application page can have different states and, or entry points, that visually appear in the client's browser as if the user has navigated to a different web page. Thus, even though the web application loads as a single page, the application can be referred to as having different pages or multiple pages. Each of the different pages usually provides different functionality within the application. One example is provided below of such a web application. The usage statistics collector 206 maintains statistics about how often a user navigates to each of the different pages of the web application each time a user requests the web application and interacts with it.

Figure 2B:
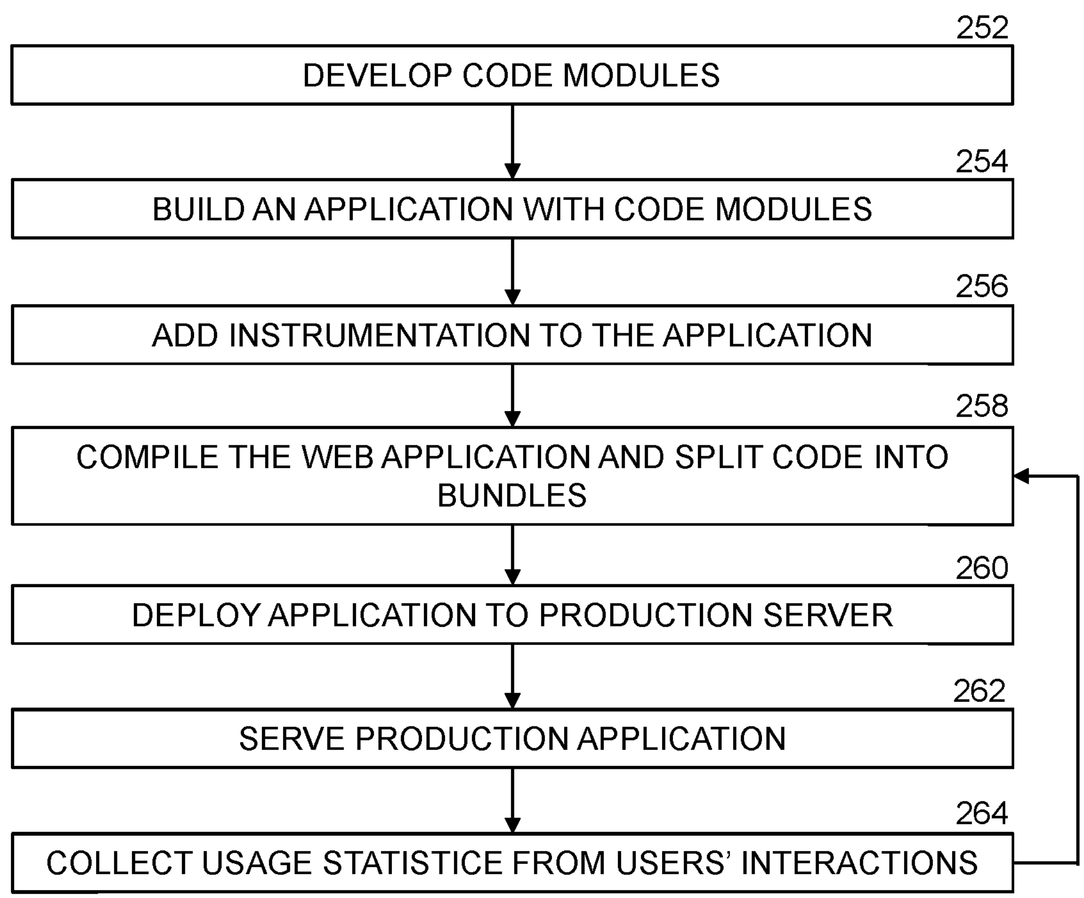
FIG. 2B is a flowchart of an example method of splitting application code in accordance with the principles of the present disclosure.

FIG. 2B is a flowchart of an example method of splitting application code in accordance with the principles of the present disclosure. FIG. 3A and FIG. 3B illustrate an example splitting of application code into bundles in accordance with the principles of the present disclosure. In step 252 of FIG. 2B, an application developer develops one or more modules of code that are used to construct a web application. The modules of code can also be provided by third-party entities that the developer simply incorporates in the web application or incorporates URL information to those modules in the web application. In step 254, the application developer builds a web application that includes a number of different modules that have various dependencies on one another. As an example, the web application can have the structure depicted in FIG. 3A. In particular, the example web application can have four "pages" of different functions that include "Dashboard", "Catalog", "Templates", and "Notifications". As the user interacts with the web application, the web application will change the information displayed within the web browser so that the user appears to be navigating between the four different pages. In this particular example, the web application includes two different modules "A" and "B". The first three pages, in FIG. 3A rely on the code of module B while the last three of the four pages rely on modules A. One of ordinary skill will recognize that a typical web application may include dozens or possibly hundreds of different modules. The two modules “A” and “B” of FIG. 3A are provided merely as an example.

In step 256, the developer uses the development environment to add instrumentation to the web application. The instrumented code includes routines that determine when a user navigates to one of the four pages and reports that navigation back to the server 104. As described above, the system 108 includes a usage statistics collector 206. Each time a user requests the web application and interacts with it, usage statistics are reported back to the server 104 for that user. The usage statistics collector 206 combines the usage statistics for all the users of the web application to calculate example usage data as shown in FIG. 3A. The instrumentation routines can be similar to a visit counter that detects when a user visits a web page. However, for each executing instance of the web application within a browser, whether or not a page is visited is sufficient data to report back to the server 104. Reporting the actual number of times each page was visited during the interaction is not necessary. As an example, when a user requests the web application, the execution instance of that application within the user’s browser can be associated with a unique identifier such that the instrumented code reports back when one of the pages is visited by the users for that unique execution instance. Similar statistics are collected for execution instances of other users or subsequent, separate execution instances by the same user.

In step 258, a module bundling application is used to compile or build the web application and split the modules, or code, of the web application into one or more bundles. The result is a production web application that can be deployed, in step 260, to a web server for serving to a requesting client or browser, in step 262. In particular, the production web application includes a main bundle for which the module bundling application determined for each of a plurality of modules whether to include that module in the main bundle of the web application a) based on how many of the plurality of pages utilize that module and b) based on respective usage statistics associated with each of the plurality of pages that utilize that module.

In the example web application of FIG. 3A, there are two code modules: A and B, that are used across the four pages of the application. One method of bundling the modules would be to simply count the uses of those modules across the pages, and then decide which modules should be placed into, or selected for, a main bundle that is loaded first, and which modules should be left in separate bundles for each page. A developer can specify to the module bundling application that if a module is used at least on x different pages, then that module is to be selected to be part of the common, or main, bundle. If, for example, x=3, then both module A and B would be added to the main bundle in the present example, as illustrated by the top row of FIG. 3B. This would result in a slow initial page load time but then a fast transition to other pages as no additional bundles need to be loaded for the other pages.

In accordance with the principles of the present disclosure, rather than simply counting module usage across the application’s pages, real world usage data for the application is used when determining how to bundle modules and, particularly, when determining which modules to select for inclusion in the main bundle. In an initial release of a web application, when usage statistics are unavailable, the simple counting technique described above can be used to determine module bundling. Then, after the application has been deployed, usage data is gathered over time, in step 264, so that when the application is later updated, in step 258, the bundling of the application can be optimized based on the usage statistics.

The bottom row of FIG. 3A shows example usage data that includes the percentage of users that visited each of the four different pages of the web application. The “Dashboard” is likely the initial page of the web application as 100% of users visited that page. Only 50% of users visited the “Catalog” page while 10% of users visited the “Templates” page and 5% of users visited the “Notifications” page. In accordance with the principles of the present invention, the collected usage data is used by the module bundling application to determine how to bundle the modules A and B.

One of ordinary skill will recognize that there are a variety of different ways that the actual usage data can be used to determine how to bundle modules. One example technique is described herein that can be modified without departing from the intended scope of the present disclosure. Simply counting each occurrence of a module on one of the web pages essentially gives each occurrence a score of “1”. In accordance with the principles of the present disclosure, that score of “1” can be weighted, or scaled, based on the usage statistics for a page. In the example of FIG. 3A, module A is utilized by three of the four pages of the application with usage figures of 50%, 10%, and 5%. Thus, rather than module A being assigned a score of “3” (i.e., 1+1+1), module A can be assigned a score of (0.5+0.1+0.05)=0.65. Module B is used by pages with usage figures of 100%, 50%, and 10%, such that the module bundling application can assign module B a score of (1+0.5+0.1)=1.6. In embodiments, the module bundling application provides a user configurable threshold parameter that determines whether or not a bundle is included in the main, or common, bundle that is initially loaded for the web application. In the present example, assuming the configurable threshold is “1.5”, module B would be included in the main bundle, but module A would not be, as depicted in the bottom row of FIG. 3B.

In other words, when the executing web application causes the browser to load the “Dashboard” page, no extra modules are needed, but when the executing web application causes the browser to load any of the other three pages (for the first time), module A needs to be loaded. Based on relying, at least in part, on collected usage statistics, module A is not moved by the module bundling application to the main bundle, as it is used on less popular pages compared with module B. This results in code splitting that is better optimized for faster page load times at the cost of slightly slower transitions to pages that require module A.

Thus, in accordance with the principles of the present disclosure there is a usage gathering component, where the application code is instrumented to log user accesses for each page of the application and provide that information to the server serving the web application. There is also an extension to the build-time module bundling tool that uses the data from the usage gathering component to change the bundling behavior. This provides a feedback loop where the usage data enables the application delivery to be optimized according to how the application is used. There is an initial benefit, the first time the bundling behavior is modified to depend on collected usage data and there is an ongoing incremental benefit when the bundling behavior depends on the most recently collected set of usage data if the invention is used for each production update. In some embodiments, the usage statistics collected after a most-recent update are added to all the usage statistics collected previously, when compiling a new production update. In other embodiments, only the usage statistics collected since the most-recent update are used when compiling a new production update (i.e., the data of earlier usage patterns are discarded).

Figure 4:
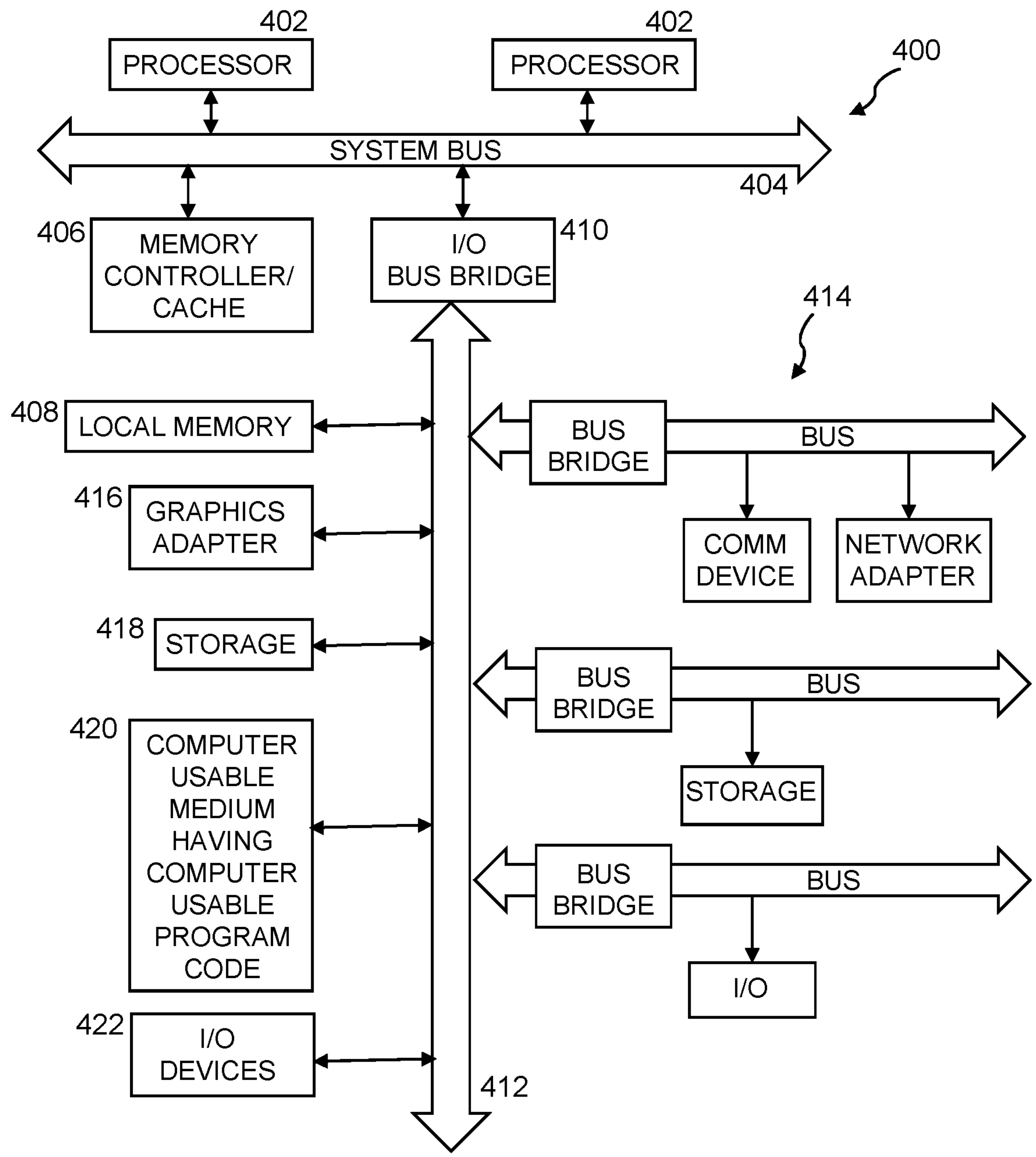
FIG. 4 depicts a block diagram of a data processing system in accordance with the present disclosure.

Referring to FIG. 4, a block diagram of a data processing system is depicted in accordance with the present disclosure. A data processing system 400, such as may be utilized to implement the system 108, the server 104 or the development system 102 or aspects thereof, e.g., as set out in greater detail in FIG. 1-FIG. 3B, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more buses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3B. It should be appreciated that the data processing system 400 can be implemented in the form of any system including a processor and memory that is capable of performing the functions and/or operations described within this specification. For example, the data processing system 400 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The data processing system 400, such as may also be utilized to implement the system 108, the server 104 or the development system 102, or aspects thereof, e.g., as set out in greater detail in FIG. 1-FIG. 3B.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving a web application that includes a plurality of code modules and is configured to display a plurality of pages;

instrumenting each of the plurality of pages with respective instrumentation code;

receiving, from the respective instrumentation code, respective usage statistics indicating how often each one of the plurality of pages are navigated to;

identifying a subset of the plurality of code modules to incorporate into a main bundle of the web application based on how many of the plurality of pages utilize a particular module in the subset and based on respective usage statistics associated with those pages of the plurality of pages that utilize the particular module; and building a production version of the web application including the main bundle.

2. The method of claim 1, wherein respective usage statistics associated with a particular one of the plurality of pages is indicative of a percentage of users of the web application that visit the particular one page.

3. The method of claim 1, further comprising:

deploying the production version of the web application.

4. The method of claim 1, further comprising:

receiving input indicative of a user configurable threshold related to creating the main bundle.

5. The method of claim 4, further comprising:

calculating a respective score for each of the plurality of modules based on how many of the plurality of pages utilize that module and based on the respective usage statistics associated with each of the plurality of pages that utilize that module.

6. The method of claim 5, wherein the identifying is based on comparisons of the respective scores and the user configurable threshold.

7. The method of claim 1, further comprising:

receiving, from the respective instrumentation code, respective updated usage statistics;

identifying a different subset of the plurality of code modules to incorporate the a main bundle of the web application based on how many of the plurality of pages utilize a particular module in the subset and based on respective updated usage statistics associated with those pages of the plurality of pages that utilize the particular module; and building an updated production version of the web application including the updated main bundle.

8. The method of claim 1, wherein the web application includes a single page web application.

9. The method of claim 8, wherein each of the plurality of pages corresponds to a different page state.

10. The method of claim 8, wherein the web application includes JavaScript code.

11. A computer hardware system, comprising:

a processor programmed to initiate the following executable operations:

receiving a web application that includes a plurality of code modules and is configured to display a plurality of pages;

instrumenting each of the plurality of pages with respective instrumentation code;

receiving, from the respective instrumentation code, respective usage statistics indicating how often each one of the plurality of pages are navigated to;

identifying a subset of the plurality of code modules to incorporate into a main bundle of the web application based on how many of the plurality of pages utilize a particular module in the subset and based on respective usage statistics associated with those pages of the plurality of pages that utilize the particular module; and building a production version of the web application including the main bundle.

12. The method of claim 1, wherein respective usage statistics associated with a particular one of the plurality of pages is indicative of a percentage of users of the web application that visit the particular one page.

13. The method of claim 11, further comprising:

deploying the production version of the web application.

14. The method of claim 11, further comprising:

receiving input indicative of a user configurable threshold related to creating the main bundle.

15. The method of claim 14, further comprising:

calculating a respective score for each of the plurality of modules based on how many of the plurality of pages utilize that module and based on the respective usage statistics associated with each of the plurality of pages that utilize that module.

16. The method of claim 15, wherein the identifying is based on comparisons of the respective scores and the user configurable threshold.

17. The method of claim 11, further comprising:

receiving, from the respective instrumentation code, respective updated usage statistics;

identifying a different subset of the plurality of code modules to incorporate the a main bundle of the web application based on how many of the plurality of pages utilize a particular module in the subset and based on respective updated usage statistics associated with those pages of the plurality of pages that utilize the particular module; and building an updated production version of the web application including the updated main bundle.

18. The method of claim 11, wherein the web application includes a single page web application.

19. The method of claim 8, wherein each of the plurality of pages corresponds to a different page state.

20. A computer program product, comprising:

a computer readable storage medium having program code stored thereon, the program code executable by a data processing system to initiate the following executable operations:

receiving a web application that includes a plurality of code modules and is configured to display a plurality of pages;

instrumenting each of the plurality of pages with respective instrumentation code;

receiving, from the respective instrumentation code, respective usage statistics indicating how often each one of the plurality of pages are navigated to;

identifying a subset of the plurality of code modules to incorporate into a main bundle of the web application based on how many of the plurality of pages utilize a particular module in the subset and based on respective usage statistics associated with those pages of the plurality of pages that utilize the particular module; and building a production version of the web application including the main bundle.

* * * * *